US00RE35282E

United States Patent [19]

Blane

[11] E Patent Number: Re. 35,282

[45] Reissued Date of Patent: Jun. 25, 1996

[54] PUSH ROD APPARATUS

[76] Inventor: Henry K. Blane, 600 Dutchmans Dr., Hermitage, Tenn. 37076

[21] Appl. No.: 322,923

[22] Filed: Oct. 13, 1994

Related U.S. Patent Documents

Reissue of:

[64] Patent No.: 5,154,145
Issued: Oct. 13, 1992
Appl. No.: 826,051
Filed: Jan. 27, 1992

[51] Int. Cl.[6] ..... F01L 1/14

[52] U.S. Cl. ..... 123/90.61

[58] Field of Search ..... 123/90.61, 90.62, 123/90.63, 90.64, 90.33, 90.35, 90.38

[56] References Cited

U.S. PATENT DOCUMENTS

| | | | |
|---|---|---|---|
| 1,620,446 | 3/1927 | Dickinson | 123/90.61 |
| 2,067,114 | 1/1937 | Ashton | 123/90.61 |
| 2,970,585 | 2/1961 | Lombardi | 123/90.61 |
| 3,301,241 | 1/1967 | Iskenderian | 123/90.61 |
| 4,538,560 | 9/1985 | Alden | 123/90.38 |
| 4,589,384 | 5/1986 | Ott | 123/90.61 |
| 4,593,659 | 6/1986 | Wells et al. | 123/90.38 |
| 5,000,137 | 3/1991 | Wreinert et al. | 123/90.61 |
| 5,095,860 | 3/1992 | Newell | 123/90.38 |
| 5,095,862 | 3/1992 | Murphy | 123/90.61 |

*Primary Examiner*—Weilun Lo
*Attorney, Agent, or Firm*—Waddey & Patterson; I. C. Waddey, Jr.

[57] ABSTRACT

A push rod is arranged with a central coaxially aligned tubular body, including a bore directed coextensively throughout the tubular body. An internally threaded insert is mounted with an upper distal end of the tubular body threadedly to an elongate threaded rod member formed with a hex boss mounted and formed to an upper distal end of the threaded rod member portion, with an extension rod coaxially aligned with the threaded rod member extending beyond the threaded rod member terminating in a first hemi-spherical tip. A first bore is directed coextensively throughout the rod member, extension rod, and hex boss. A lock nut is threadedly received about the threaded rod member for engagement with the insert hex for locking of the threaded rod member relative to the tubular body. A lower insert rod is received within a lower distal end of the tubular body formed with an abutment ring and terminating in a second hemi-spherical tip. The push rod is accordingly longitudinally adjustable to accommodate varying internal combustion engine spacings from an associated valve tappet to a rocker arm. [A lubrication container is arranged for mounting a set of such push rods prior to use.]

6 Claims, 2 Drawing Sheets

PUSH ROD APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The field of invention relates to push rod construction, and more particularly pertains to a new and improved push rod apparatus wherein the same is arranged to provide for adjustable push rod for use in an internal combustion engine.

2. Description of the Prior Art

Push rods of various types are utilized within internal combustion engines to accommodate varying internal combustion engine configurations. Push rod apparatus is exemplified in the prior art in the U.S. Pat. No. 4,864,983 to Breitbarth; U.S. Pat. No. 4,645,639 to Potter; U.S. Pat. No. 3,661,127 to Cornell; and U.S. Pat. No. 4,442,770 to Dozier.

Accordingly, it may be appreciated that there continues to be a need for a new and improved push rod apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of push rod apparatus now present in the prior art, the present invention provides a push rod apparatus wherein the same is arranged with a central tubular body permitting extension of a threaded rod directed from an upper distal end of the tubular body. As such, the general purpose of the present invention, which will be described subsequently in greater detail, is to provide a new and improved push rod apparatus which has all the advantages of the prior art push rod apparatus and none of the disadvantages.

To attain this, the present invention provides a push rod arranged with a central coaxially aligned tubular body, including a bore directed coextensively throughout the tubular body. An integrally threaded insert is mounted with an upper distal end of the tubular body threadedly to an elongate threaded rod member formed with a hex boss mounted and formed to an upper distal end of the threaded rod member portion, with an extension rod coaxially aligned with the threaded rod member extending beyond the threaded rod member terminating in a first hemi-spherical tip. A first bore is directed coextensively throughout the rod member, extension rod, and hex boss. A lock nut is threadedly received about the threaded rod member for engagement with the insert hex head for locking of the threaded rod member relative to the tubular body. A lower insert rod is received within a lower distal end of the tubular body formed with an abutment ring and terminating in a second hemi-spherical tip. The push rod is accordingly longitudinally adjustable to accommodate varying internal combustion engine spacings from an associated valve tappet to a rocker arm. [A lubrication container is arranged for mounting a set of such push rods prior to use.]

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved push rod apparatus which has all the advantages of the prior art push rod apparatus and none of the disadvantages.

It is another object of the present invention to provide a new and improved push rod apparatus which may be easily and efficiently manufactured and marketed.

It is a further object of the present invention to provide a new and improved push rod apparatus which is of a durable and reliable construction.

An even further object of the present invention is to provide a new and improved push rod apparatus which is susceptible of a low cost of manufacture with regard to both materials and labor, and which accordingly is then susceptible of low prices of sale to the consuming public, thereby making such push rod apparatus economically available to the buying public.

Still yet another object of the present invention is to provide a new and improved push rod apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

[FIG. 12 is an isometric illustration of a reservoir housing for use by the invention.]

[FIG. 13 is an orthographic view, taken along the lines 13—13 of FIG. 12 in the direction indicated by the arrows.]

[FIG. 14 is an orthographic view of section 14 as set forth in FIG. 13.]

DESCRIPTION OF THE PREFERRED EMBODIMENT

Figure 1:
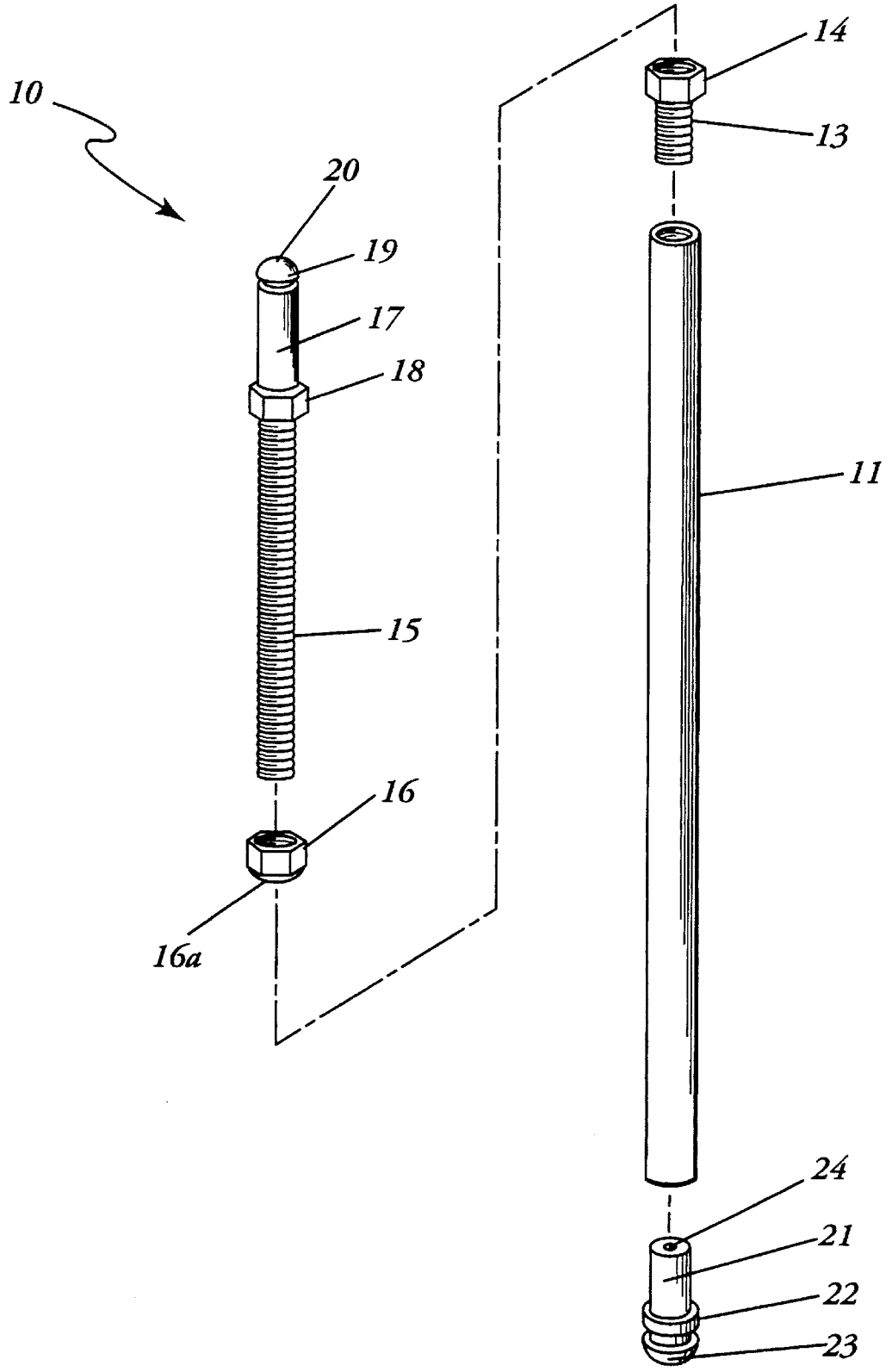
FIG. 1 is an isometric illustration of the instant invention in an exploded illustration.
Figure 2:
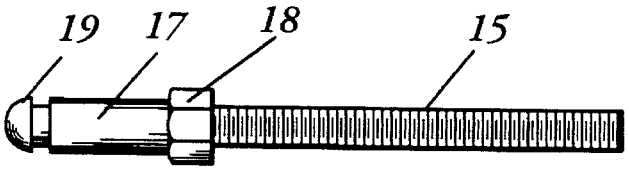
FIG. 2 is an orthographic side view of the threaded rod assembly.
Figure 3:
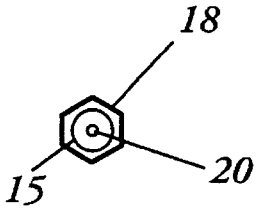
FIG. 3 is an orthographic bottom view of the assembly as set forth in FIG. 2.

With reference now to the drawings, and in particular to FIGS. 1 to [14] *11* thereof, a new and improved push rod apparatus embodying the principles and concepts of the present invention and generally designated by the reference numeral 10 will be described.

More specifically, the push rod apparatus 10 of the instant invention essentially comprises a central tubular body 11 including a tubular body bore 12 extending throughout the tubular body. The tubular body includes an internally threaded insert 13 threadedly or fixedly secured within an upper distal end of the bore 12. The insert 13 includes an insert hex head 14 mounted to an upper distal end of the insert extending radially and exteriorly thereof for abutment with an upper distal end of the tubular body. A threaded rod member 15 is threadedly received with the internally threaded insert 13, wherein the threaded rod member 15 includes an internally threaded lock nut threaded received thereabout for engagement with the insert hex head 14 for locking in longitudinal orientation of the threaded rod member 15 relative to the threaded insert 13. An extension rod 17 extends coaxially and forwardly of the threaded rod member 15, with a hex boss 18 extending radially exteriorly of the extension rod 17 and the threaded rod member 15. The hex boss provides for ease of rotation of the threaded rod member 15 relative to the insert 13 in use and adjustment of the push rod relative to an internal combustion engine (not shown). A first hemi-spherical tip 19 terminates the upper distal end of the extension rod 17 typically for engagement with a rocker arm of an internal combustion engine. A first bore 20 is directed coextensively through the threaded rod member 15, the extension rod 17, and the hex boss 18 to include the hemi-spherical tip 19.

A lower inset rod 11 is received within the lower distal end portion of the tubular body 11 within the tubular body bore 12. The lower insert rod 21 includes an abutment ring 21 extending radially and exteriorly thereof for abutment with the lower distal end of the tubular body 11, and with the insert 21 terminating in a second hemi-spherical tip 23 at a free distal end of the lower insert. A second bore 24 extends coextensively and coaxially of the second insert to include the lower insert rod 21, the abutment ring 22, and the second hemi-spherical tip 23.

Figure 4:
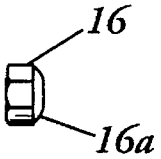
FIG. 4 is an orthographic side view of the lock nut structure.
Figure 5:
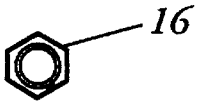
FIG. 5 is an orthographic bottom view of the lock nut structure.
Figure 6:
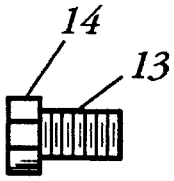
FIG. 6 is an orthographic side view of the threaded insert.
Figure 7:
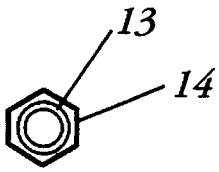
FIG. 7 is an orthographic bottom view of the threaded insert.
Figure 8:
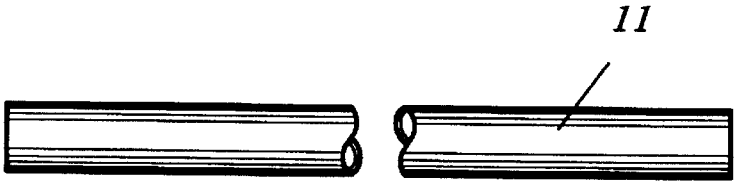
FIG. 8 is an orthographic side view of the tubular body.
Figure 9:
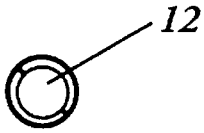
FIG. 9 is an orthographic bottom view of the tubular body.
Figure 10:
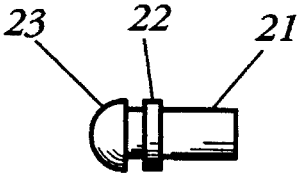
FIG. 10 is an orthographic side view of the lower insert portion.
Figure 11:
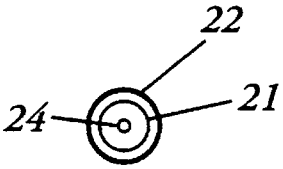
FIG. 11 is an orthographic bottom view of the lower insert portion.

Typically, the push rod is of a minimum length for utilization in a motorcycle engine, such as a "Harley Davison" (R) to be defined by 7.5 inches n length. The three eighths inch internally threaded lock nut 16 includes a beveled lower portion for engagement with the insert hex head 14 to insure ease of locking. The beveled surface 16a is illustrated in the FIGS. 1 and 4.

[The FIGS. 12–14 illustrate the use of a reservoir housing 25 by the organization, wherein the reservoir housing is formed to include a housing top wall 26, with a top wall opening 27 directed therethrough to receive a lubricant 29. A cap 28 is arranged for securement about the opening 27 to maintain lubricant therewithin. The push rods are directed through a housing first end wall 30 to be directed into the lubricant within the housing and upon projection may be directed through the second end wall 31 upon use of the push rods. In this manner, the push rods are maintained in a lubricated bath prior to use to maintain their surfaces free of corrosion, debris, and the like.]

[The first end wall 30 includes a plurality of entrance openings 32, each entrance opening 32 is coaxially aligned with an exit opening 36 within, the second end wall 31. Each entrance opening 32 includes radially oriented flap members 33 within each entrance opening, with a first door plate 34 (see FIG. 13) positioned by a first spring hinge 35 to an interior surface of the first end wall 30. In this manner, the push rods may be directed into the housing. The exit openings 36 include exit opening flaps 37 radially directed into the exit openings to maintain fluid within the housing in a like manner as the entrance opening flap members 33. A second door plate 38, including a second door plate spring hinge 39, is mounted to an exterior surface of the second end wall 31 to insure fluid sealing of the lubricant contained within the housing and permit projection of the push rods through the exit opening and the second door plate 38 upon use of each push rod.]

[As to the manner of usage and operation of the instant invention, the same should be apparent from the above disclosure, and accordingly no further discussion relative to the manner of usage and operation of the instant invention shall be provided.]

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A push rod apparatus, comprising, at least one push rod, the at least one push rod [include] *including* a central tubular body, the central tubular body includes a tubular body bore extending coextensively and coaxially of the central tubular body, and an internally threaded insert is received within the central tubular body through an upper distal end of the tubular body into the tubular body bore, the internally threaded insert includes a head member projecting radially and exteriorly of the threaded insert, wherein the head member is arranged for abutment with the upper distal end of the central tubular body, and a threaded rod member threadedly received within the internally threaded insert, the rod member includes an internally threaded lock nut threadedly secured about the threaded rod member, [the internally threaded lock nut includes a beveled lower end surface for engagement with the threaded insert head,] and the threaded rod member includes [an extension rod extending coaxially of the threaded rod member, wherein the extension rod terminates in] a first hemi-spherical tip, and a boss member extending radially and fixedly to the threaded rod member extending exteriorly then of [at an intersection with the extension rod,] and a lower insert rod *having opposing ends, one end* received within the central tubular body through a lower end portion thereof, [wherein the central tubular body includes a lower distal end,] and *a second hemi-spherical tip at the other end* of the lower insert rod [includes an abutment ring extending exteriorly and radially at a lower distal end of the lower insert rod for abutment with the tubular body lower distal end, and the lower insert rod includes a second semi-spherical tip fixedly mounted to the lower insert rod below the abutment ring].

2. A push rod as set forth in claim 1 including a first bore coextensively directed through the threaded rod member[, the extension rod,] and the first hemi-spherical tip, and a second bore directed coextensively through the second semi-spherical tip[, the abutment ring,] and the lower insert rod.

[3. A push rod as set forth in claim 2 including a reservoir housing receiving the central tubular body therethrough, wherein the reservoir housing includes a top wall, the top wall including a top wall opening, and a top wall cap selectively mounted relative to the top wall opening, and a lubricant arranged for projection through the top wall opening, and the housing including a housing first end wall spaced from and parallel to a housing second end wall, the housing first end wall includes at least one entrance opening, and the second end wall includes at least one exit opening, wherein the at least one entrance opening is coaxially aligned with the at least one exit opening, and the entrance opening includes a plurality of radially oriented flap members extending into the entrance opening, and the exit opening includes a further plurality of radial flaps directed into the exit opening.]

[4. A push rod as set forth in claim 3 including a first door plate, the first door plate mounted to the first end wall within the housing, and the first door plate includes a first spring hinge mounting the first door plate forwardly of the entrance opening and above the entrance opening, wherein the first door plate is arranged to effect a fluid lubricant seal within the housing minimizing lubricant loss through the entrance opening, and the exit opening includes a second door plate hingedly mounted to the second end wall to an exterior surface of the second end wall, wherein the second door plate includes a second spring hinge hingedly mounting the second door plate over the exit opening to effect a fluid seal relative to the exit opening.]

*5. A push rod as set forth in claim 1 wherein the threaded rod member further includes an extension rod extending coaxially of the threaded rod member wherein the extension rod terminates in the first hemi-spherical tip.*

*6. A push rod as set forth in claim 5 wherein the boss member is located at an intersection between the extension rod and the threaded rod member.*

*7. A push rod as set forth in claim 1 wherein the lower insert rod includes an abutment ring extending exteriorally and radially at a lower distal end of the lower insert rod for abutment with the central tubular body, and the second hemi-spherical tip of the lower insert rod is fixedly mounted to the lower insert rod below the abutment ring.*

*8. A push rod as set forth in claim 1 wherein the internally threaded lock nut includes a beveled lower end surface for engagement with the threaded insert head.*

* * * * *